Dec. 29, 1942.   H. H. BUNKER ET AL   2,306,520
GRATING STRUCTURE
Filed April 19, 1941    2 Sheets-Sheet 1
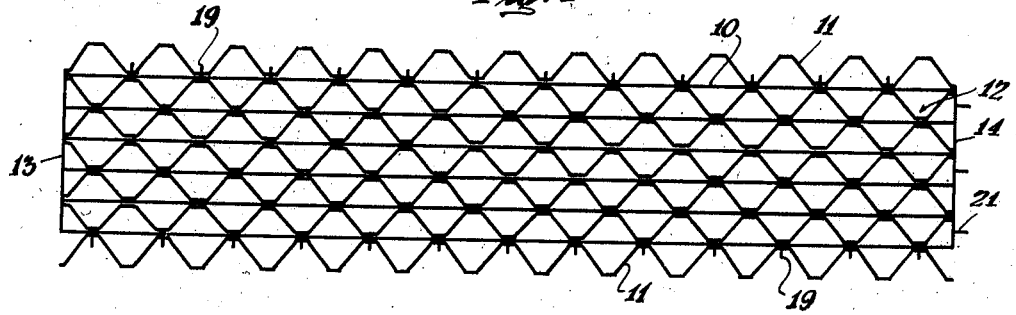
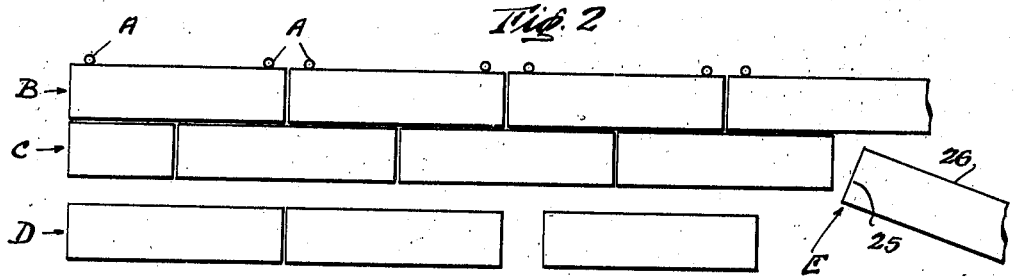
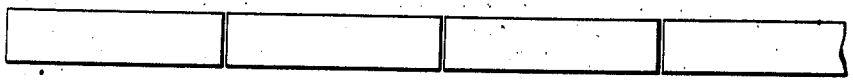
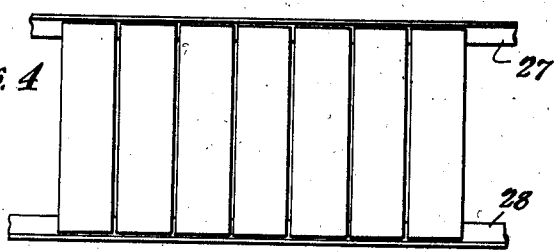
INVENTORS
Herbert H. Bunker
Ernest L. Tarof
BY Cooper, Kerr & Dunham
ATTORNEYS

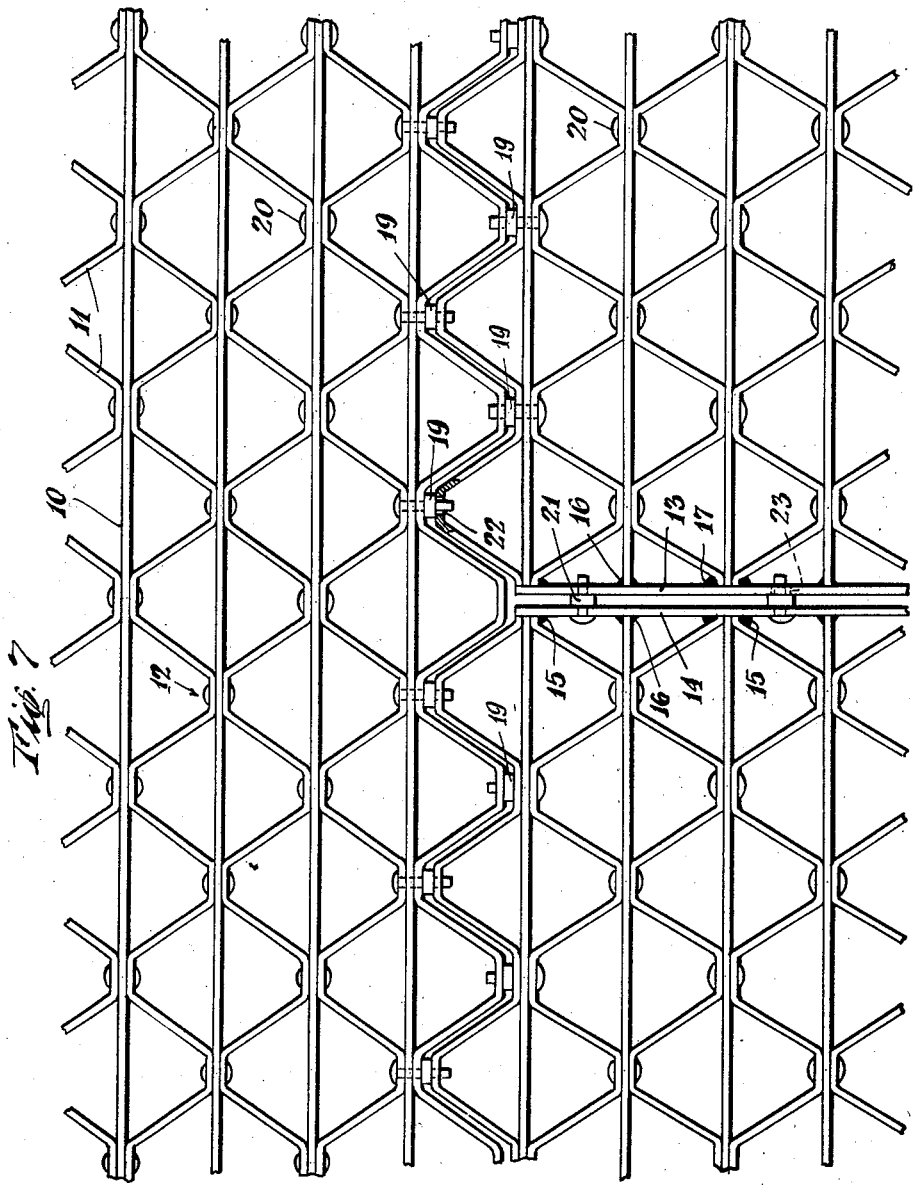

Patented Dec. 29, 1942

2,306,520

UNITED STATES PATENT OFFICE 2,306,520

GRATING STRUCTURE

Herbert H. Bunker, Jersey City, N. J., and Ernest L. Tarof, Brooklyn, N. Y., assignors to Kerlow Steel Flooring Company, Jersey City, N. J., a corporation of New Jersey Application April 19, 1941, Serial No. 389,292

1 Claim. (Cl. 94—30)

This invention relates to grating structures suitable for use as flooring and particularly for use as a landing surface for aircraft and for forming and surfacing roadways.

It is among the objects of this invention to provide a flooring consisting of a composite grating structure assembled from a number of uniformly formed grating panels provided with engaging elements affording a simple manner for assembling the panels into the composite structure.

Another object is to provide individual grating panels and means for connecting the panels together into one continuous floor pattern without the need of tools or loose connecting elements such as bolts, and which may be quickly assembled together or disassembled without need of particular skill or prior experience.

It is a recognized requisite for proper operation and maintenance of aircraft that good landing facilities be provided. Large and well kept air ports near the larger cities are oftentimes provided with permanent runways of reinforced concrete. At places where aircraft make only occasional landings the more expensive surfacings are not justified and rolled areas are used. For continued usefulness of such areas constant inspection and frequent scraping and repairing is required. Sunken or washed out areas must be refilled and where the ground is soft, replacement of soil is required in order to maintain level conditions. An important aim of the present invention is to provide a flat and durable landing surface which may be laid directly upon the ground. In some cases no particular preparation of the ground is needed as rough leveling will suffice. The laying of the landing surface renders the ground covered suitable for long and continued use with but a modicum of supervision and interruption of use because of soil erosion.

Another object, and one which, together with the foregoing expressed aim, has particular merit for military utility, is the provision of a landing deck which is suitable for transportation and repeated placement in different areas, in open or cleared fields, on roads, or wherever a temporary airport may be desired, and which is capable of so matching the general landscape as to make it difficult of detection by one unfamiliar with its location as to be practically indiscernible from fairly proximate points.

Further objects of the present invention will be hereinafter set forth in the accompanying specification and claims and demonstrated by the drawings which show by way of illustration a preferred embodiment and the principle of our invention and what we now consider the best mode in which we have contemplated applying that principle. Other embodiments of the invention employing the same principle may be used and structural changes made as desired by those skilled in the art within the spirit of the appended claim and without departing from the present invention.

Having reference to the drawings:

Fig. 1 diagrammatically illustrates a panel or section of grating;

Fig. 2 illustrates a method by which the grating panels may be assembled into a grating structure;

Fig. 3 illustrates another method by which grating panels may be assembled to form a grating structure;

Fig. 4 illustrates how grating panels may be used to form a walkway for industrial uses or a wide runway;

Fig. 5 is intended to roughly illustrate what the character of the ground may be when the panels are being laid;

Fig. 6 is an end view of a panel; and

Fig. 7 is a detail and plan showing the junction of three panels and the manner in which the panels are locked against displacement relative to one another.

In the interest of simplicity of use it is desirable that all of the grating panels which form the composite flooring be of uniform construction and of the same size so that any one panel in interchangeable with any other panel of a given floor pattern. A panel which we have found suitable and serviceable to fulfill the objects of our invention is illustrated in Fig. 1. This panel is made up of strips of straight bars 10 and crimp bars 11 which are alternately arranged with respect to one another and secured together in such manner as to provide uniform meshes within the panel. These bars stand on edge and have their broad sides fastened together at their points of contact 12 as is well understood in the art. For fastening these bars, rivets or welding may be employed. In the application of the invention for providing a landing surface upon earth, it is preferable that the straight bars and crimp bars be of the same depth although the crimp bars may have the lesser depth, if desired, such, for example, as described in United States Patent No. 2,014,912.

Each panel constitutes a fabricated unit whose width is determined by the numbers of straight and crimp bars assembled together. The width and length of the panel may be such as to afford a unit which may be easily transported and handled.

For convenience of reference only we shall refer to the direction of the strips as being longitudinally of the panel, the sides of the panel as being the edges having the longest dimension, and the ends of the panel as being the edges having the shortest dimension. While the sides of the panel may be otherwise finished, we have found that if the sides are provided with crimp bars as illustrated in Figs. 1 and 7, a more positive locking relationship between juxtaposed panels is obtained. Advantages resulting from this arrangement will be referred to with more particularity hereinafter. Each panel is preferably rectangular in general outline and has at each of its ends bars 13, 14 extending laterally to the longitudinally extending straight bars and secured thereto preferably by welding as at 15, 16, 17 (Fig. 7). Corners of two adjacent panels are illustrated at the lower half of Fig. 7.

One of the objects of the present invention is to facilitate the assembly of a composite flooring. To this end we provide connecting elements which preferably are permanent parts of each of the panels. A simple form of such elements consists of a pin and slot connection which can be variously applied. By this term we mean to include any type of mortise and tenon connection or readily engageable and disengageable elements in other forms which are suitable for preventing appreciable movement of joined panels in respect to one another in planes perpendicular to the surfaces of the panels.

The pin elements of these connecting means preferably are carried by and extend from both sides and from one end of each panel and the slot elements of the connecting means are carried by the side bars and an end bar of each panel. It will be appreciated that this arrangement provides a double row of pin and slot connections along the panel sides as illustrated in Fig. 7. Having reference to Fig. 1, it will be seen that the pin elements at the ends of the panel are carried by bar 14 at the right hand end of the panel, whereas the slot elements are in the left hand end bar 13. Details of these connections are illustrated in Fig. 7.

We have found it convenient to provide the pin elements at the sides as parts of the rivets by which each side bar is fastened to an adjoining bar in the panel. For this purpose stud rivets 19 are used in lieu of the common rivets 20 such as are elsewhere employed for fastening together the bars of the panel. The pins at the right hand end of the grating (Fig. 1) constitute the projections of stud rivets 21 which are permanently engaged in the end bar 14.

For forming the slot element of the pin and slot connections, holes 22 are punched in the side bars and similar holes 23 are punched in the left hand end bar 13, Fig. 6. While these holes may be slightly elongated in a horizontal plane for facilitating assembly of the panels, it is intended that they engage the pins fairly snugly at the upper and lower surfaces of the pins so as to prevent movement at the edges of the various panels which would permit the edge of one panel to rise above or drop below the edge of an adjacent panel while in use.

One manner of assembling the panels into a composite flooring is illustrated in Fig. 2. If necessary the ground surface is leveled sufficiently to remove hummocks and other obstructions which would interfere with the laying of a fairly level floor.

In laying out an air field or runway, a series of stakes or other anchoring means is driven in a line along a predetermined edge of the proposed grating area and then a series of panels is placed in position against these stakes with their ends abutting and their pin and slot connections in cooperating relationship. To accomplish this each successively laid panel is moved edgewise to permit the pins to enter the slots. As illustrated in Fig. 2, two courses of panels B and C have been started. Preferably the panels are laid in echelon, that is, the panels in one course overlap the joints of the panels in adjacent courses. The first two panels of the third course D are shown joined end to end through their pin and slot connections at their ends and the third panel is ready to be moved endwise into joining relationship with the second panel. All three panels can then be moved as a unit against the panels of course C and joined thereto along their edges by means of the pin and slot connections there provided. Additional panels may be added to the previously laid panels either in groups, or individually.

For placing a single panel in position, the pin and slot connections at the meeting corners E may be joined and the panel worked into place by sliding it upon the ground and causing successive engagement of the various pin and slot connections starting from the point E and extending along the inside edges 25 and 26 of the newly added panel. It is intended that this or similar procedure be continued until a surface of the desired area is obtained. It is apparent that the length of the flooring can be extended indefinitely while its width is being increased and that whatever the ultimate area of the landing surface the several panels or units are joined into a continuous sheet.

With reference to the adjoining side edges of the panels it is to be noted that there is no definite straight line of cleavage between the various courses because of the nesting of the crimped bars along this line. A travelling load such as is transmitted by a wheel is therefore gradually transferred from one panel in one course to an adjoining panel in an adjacent course over the overlapping diagonal portions of the adjoining crimped bars between the courses and the effect of impact at the panel edges is avoided. This is true, whatever be the direction of traffic over the laid grating. While a similar result may be accomplished at the abutting end edges of adjoining panels, the relatively shorter dimension makes this consideration of less importance, particularly so since the use of straight bars 13 and 14 involves a simple construction which is justified by its strength and relatively economical cost.

By virtue of the character of the fastening means between panels, an interior panel cannot be lifted bodily from its position as part of the floor, and no such panel can be moved sidewise or endwise without first removing adjacent panels. The floor is a locked composite structure whose compact condition may be assured by stakes or other anchoring means at its outer edges.

As it is laid on the ground and during use, earth will work up in the meshes and add its effect for maintaining the panels immobile and locked together.

A particular advantage of the flooring is its serviceability for military aviation use. It is easily transportable and can be assembled and disassembled with dispatch. Its use obviates much labor which would otherwise be required to prepare a field for receiving aircraft. A most important characteristic is its terrain revealing and terrain matching characteristics. From high above its presence is difficult to detect because it has much the same appearance as bordering terrain. Its dominating color appearance is that of the ground which shows through the meshes and grass can grow through the surface without diminishing its utility as a landing area. Another advantage resides in its ease of assembly. The panels can be quickly connected together even at night and under adverse working conditions.

We have found that panels provided with mesh openings formed by a rivet spacing along straight bars of 7½ inches and a spacing of straight bars of 3¾ inches provides a satisfactory surface for vehicular traffic on rubber tires, such as are used on air craft. A panel made up of structural steel strips 1 inch by $\frac{3}{16}$ of an inch and having a width of 7 spaces between strips or approximately 2 feet 2¼ inches, and a length of 13 spaces between rivets or a length of approximately 8 feet 1½ inches, as illustrated in Fig. 1, is of convenient size. Limitations imposed by transportation facilities are factors which must be considered particularly for military use. These dimensions are appropriate for use of the invention as a landing area for an air port when laid upon the ground. It is to be appreciated, however, that the invention has other uses, such, for example, as for roadways, walkways, or other flooring supported upon beams or otherwise. In such uses the size of the meshes, weight of the strips, and size of panel are to be proportioned to suit the various conditions of load and support and the length of panel should be equal to or a multiple of the span between supporting beams.

As illustrated in Fig. 3, the panels may be used to form parallel runways spaced apart sufficiently to underlie the wheels of a truck. A string of panels may be formed by connecting them either end-to-end, or side-to-side, depending upon their dimensions and the width of runway desired.

For industrial uses, on shipboard and on bridges the simple manner of connecting panels affords a desirable construction for walkways. As illustrated in Fig. 4, the several panels are connected together side-to-side and supported at their ends in angle frame members 27, 28. The pin and slot connections serve to distribute load between the panels and prevent such tipping or flexing as might expose an edge against which one could trip. In this arrangement pins or slots at the panel ends could be dispensed with unless desired for anchoring the panels down upon the supporting angle irons.

While the invention has particular merit for quick assembly and immediate use without necessitating additional fastening means, it will be appreciated that, if desired, the laid grating may be filled with concrete, asphalt, or any other type of mastic.

What is claimed is:

A composite reticulated floor structure suitable for ready disassembly to effect transportation, said floor structure comprising a plurality of individual rectangular panels which are detachably joined to one another along their edges, each of said panels comprising alternately arranged straight and crimp bars disposed on edge and permanently fastened together at the bends in said crimp bars, each panel having crimp bars at two marginal edges of each panel and which nest with similar crimp bars of adjacent panels and provide the increased strength of two adjacent crimp bars at the longitudinal lines of separation between adjacent panels, means for releasably connecting together said marginal crimp bars, said means comprising pins and slots at each of the bends in said marginal crimp bars so as to support each of the otherwise unsupported bends against vertical deflection, said pins extending laterally of the panel and remaining unbent after connection to allow for the ready separation of adjacent panels at will, and straight bars at the ends of each panel, said straight bars extending laterally of the panel, one of said straight bars having holes therein for receiving connecting pins from adjacent panels and the other of said straight bars having pins for detachably engaging holes in another adjacent panel, said panels of said composite floor structure being readily assembled and disassembled by relative movement of the panels in the plane of the floor structure.

HERBERT H. BUNKER.
ERNEST L. TAROF.